(12) United States Patent
Yasuhara et al.

(10) Patent No.: US 8,034,005 B2
(45) Date of Patent: Oct. 11, 2011

(54) MOTION ASSIST DEVICE

(75) Inventors: Ken Yasuhara, Wako (JP); Kei Shimada, Wako (JP); Yosuke Endo, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 68 days.

(21) Appl. No.: 12/681,322

(22) PCT Filed: Aug. 19, 2008

(86) PCT No.: PCT/JP2008/002234
§ 371 (c)(1),
(2), (4) Date: Apr. 1, 2010

(87) PCT Pub. No.: WO2009/044502
PCT Pub. Date: Apr. 9, 2009

(65) Prior Publication Data
US 2010/0234777 A1 Sep. 16, 2010

(30) Foreign Application Priority Data

Oct. 2, 2007 (JP) ................................. 2007-259175
Oct. 15, 2007 (JP) ................................. 2007-268304

(51) Int. Cl.
*A61H 1/00* (2006.01)
*A61H 1/02* (2006.01)
*A61H 5/00* (2006.01)

(52) U.S. Cl. .............................................. 601/35; 601/5
(58) Field of Classification Search .......... 601/5, 33–35; 602/16, 23–25; 623/25, 30; 331/65; 600/595
See application file for complete search history.

(56) References Cited

U.S. PATENT DOCUMENTS

2005/0177080 A1* 8/2005 Yasuhara et al. ................ 602/16
2008/0249438 A1* 10/2008 Agrawal et al. ................. 601/35

FOREIGN PATENT DOCUMENTS

JP 2004-073649 3/2004
JP 2007-061217 3/2007

* cited by examiner

*Primary Examiner* — Kristen Matter
(74) *Attorney, Agent, or Firm* — Rankin, Hill & Clark LLP

(57) ABSTRACT

A motion assist device for assisting a periodical motion of a creature such as a human by applying a force with appropriate strength to the creature so as to match a motion scale with a desired motion scale thereof regardless of a motion rhythm of the periodical motion. According to the motion assist device (1), a second model is corrected so as to approximate a value of a motion variable ($\xi$) to a desired value ($\xi_0$). A second oscillator ($\xi_2$) is generated according to the corrected second model. A periodical force (torque) (T) applied to the human (P) is controlled according to the second oscillator ($\xi_2$).

3 Claims, 6 Drawing Sheets

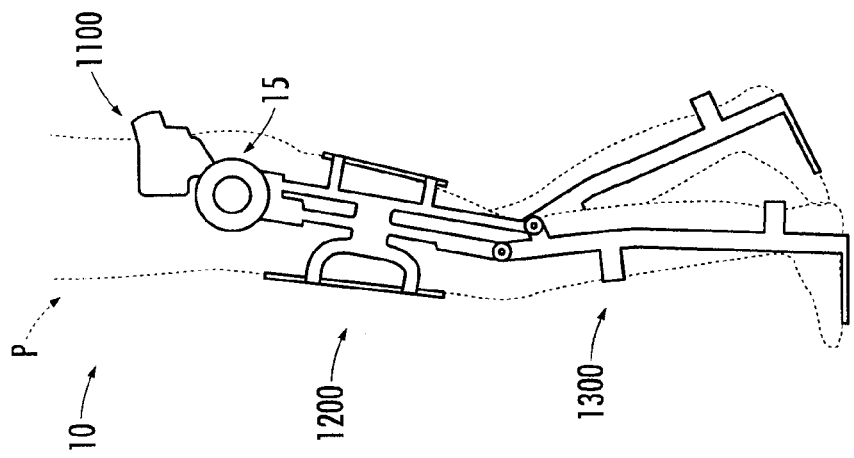
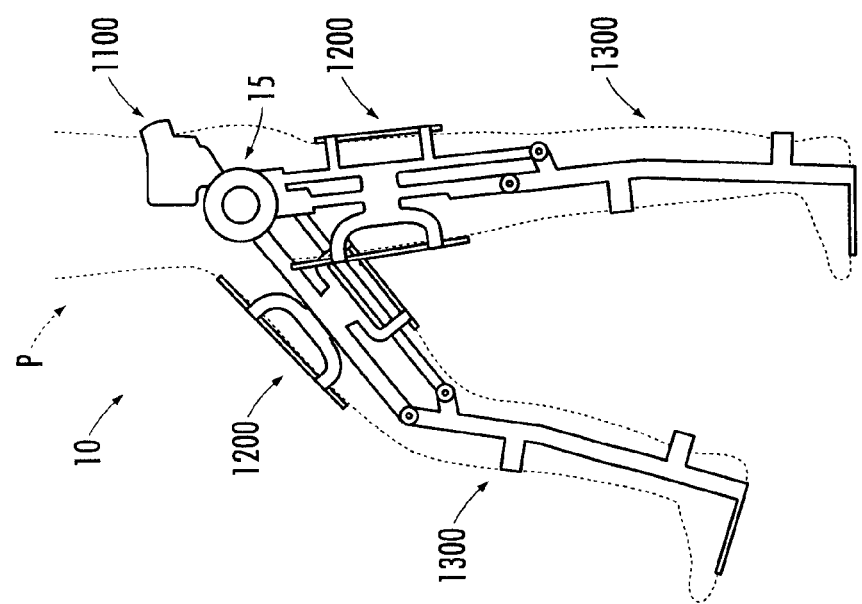

MOTION ASSIST DEVICE

PRIORITY CLAIM

The present application is based on and claims the priority benefit of Japanese Patent Application 2007-268304 filed on Oct. 15, 2007, the contents of which are incorporated herein by reference in its entirety.

BACKGROUND OF THE INVENTION

1. Field of the Invention

The present invention relates to a motion assist device for assisting a periodical motion of a creature by applying a force to the creature.

2. Description of the Related Art

There has been proposed a device for assisting a periodical walking motion of a creature, such as a human whose body part such as a lower limb or the like is suffering from physical hypofunction, by applying a periodically varying force to the creature (refer to Japanese Patent Laid-open No. 2004-073649). There has also been proposed a device for assisting or guiding a periodical motion of a human by adjusting strength of a force applied to the human according to a model (a spring model) representing a behavior feature of a virtual elastic element so as to match a motion scale of the human with a desired motion scale thereof (refer to Japanese Patent Laid-open No. 2007-061217).

According to the spring model, the strength of force applied to the human is adjusted according to a motion rhythm of the periodical motion of the human. Therefore, when an action of the human is performed fast to some extent, the periodical motion of the human can be assisted with a sufficient force from the viewpoint of matching the motion scale of the human to the desired motion scale thereof. However, on the other hand, when the human acts slowly due to remarkable physical hypofunction or the like, it is possible that the strength of force applied to the human by the motion guiding device becomes insufficient from the viewpoint of matching the motion scale of the human to the desired motion scale thereof.

SUMMARY OF THE INVENTION

The present invention has been accomplished in view of the aforementioned problems, and it is therefore an object of the present invention to provide a motion assist device for assisting a periodical motion of a creature such as a human by applying a force with appropriate strength to the creature so as to match a motion scale of the creature with a desired motion scale thereof regardless of a motion rhythm of the periodical motion.

A first aspect of a motion assist device is provided with an orthosis mounted on a creature, an actuator connected to the orthosis and a controller configured to control a magnitude and a phase of an output from the actuator, and assists a periodical motion of the creature by applying a periodically varying output from the actuator to the creature through the orthosis, wherein the controller includes a motion variable determination element configured to determine a value of a motion variable serving as a function of the magnitude of the periodical motion of the creature; a motion oscillator determination element configured to determine a first and a second motion oscillators which vary periodically according to the periodical motion of the creature, respectively; a first oscillator generation element configured to generate a first oscillator as an output oscillation signal from a first model, which generates the output oscillation signal varying at a specific angular velocity defined on the basis of a first intrinsic angular velocity by entraining to an input oscillation signal, by inputting the first motion oscillator determined by the motion oscillator determination element as the input oscillation signal to the first model; an intrinsic angular velocity setting element configured to set an angular velocity of a second virtual oscillator as a second intrinsic angular velocity on the basis of a virtual model denoting a first virtual oscillator and a second virtual oscillator which interact with each other and vary periodically with a second phase difference and a first phase difference between the first motion oscillator determined by the motion oscillator determination element and the first oscillator generated by the first oscillator generation element so as to approximate the second phase difference to a desired phase difference; and a second oscillator generation element configured to generate a second oscillator as an output oscillation signal serving as a control basis for the force applied to the creature from a second model, which generates the output oscillation signal varying at a specific angular velocity defined on the basis of the second intrinsic angular velocity set by the intrinsic angular velocity setting element according to an input oscillation signal, by inputting the second motion oscillator determined by the motion oscillator determination element as the input oscillation signal to the second model, and configured to correct the second model so as to approximate the value of the motion variable determined by the motion variable determination element to a desired value.

According to the motion assist device of the first aspect of the present invention, the second model is corrected so as to approximate the value of the motion variable serving as the function of the magnitude (motion scale) of the periodical motion of the creature. The second oscillator is generated according to the corrected second model, and the periodically varying force applied to the creature is controlled according to the second oscillator. According thereto, the periodical motion of the creature can be assisted by applying a force with appropriate strength to the creature so as to match the motion scale of the creature with the desired motion scale thereof regardless of the motion rhythm of the periodical motion.

A second aspect of the motion assist device is dependent on the first aspect of the present invention, wherein the second model is defined by a simultaneous differential equation of a plurality of state variables denoting a behavior state of the creature; the simultaneous differential equation contains a product of the desired value for the motion variable and a coefficient; and the second oscillator generation element generates the second oscillator on the basis of values of the state variables obtained by solving the simultaneous differential equation, and corrects the second model by correcting the coefficient so as to approximate the value of the motion variable determined by the motion variable determination element to the desired value.

According to the motion assist device of the second aspect of the present invention, the second model is defined by the simultaneous differential equation of a plurality of state variables denoting the behavior of a body part of the creature. A product of the desired value for the motion variable and a coefficient are contained in the simultaneous differential equation, which is the function of the magnitude of the periodical motion of the creature. The second model is corrected through adjusting the coefficient. On the basis of the values of the plurality of state variables, namely the solutions of the simultaneous differential equation for defining the corrected second model, the second oscillator is generated. On the basis of the second oscillator, the periodically varying force applied to the creature is controlled. According thereto, the periodical motion of the creature can be assisted by applying a force with appropriate strength to the creature so as to match the motion scale of the creature with the desired motion scale thereof regardless of the motion rhythm of the periodical motion of the creature.

A third aspect of the motion assist device is dependent on the first aspect of the present invention, wherein the orthosis includes a first orthosis mounted on a first body part, a second orthosis mounted on a second body part, and a third orthosis mounted on a third body part of the creature; the actuator is connected directly to the first orthosis and the second orthosis, and is connected indirectly to the third orthosis through the second orthosis; and the motion assist device applies the force to the creature through each of the first orthosis, the second orthosis and the third orthosis by controlling the actuator on the basis of the second oscillator generated by the second oscillator generation element.

According to the motion assist device of the third aspect of the present invention, the second orthosis is actuated with respect to the first orthosis and the third orthosis is actuated to following the second orthosis according to the operations of the actuator. According thereto, in addition to the periodical motion of the second body part with respect to the first body part, the motion of the third body part can be assisted to follow the motion of the second body part.

BRIEF DESCRIPTION OF THE DRAWINGS

FIG. 4(a) and FIG. 4(b) are explanatory diagrams illustrating operations of the motion assist device.

DETAILED DESCRIPTION OF THE PREFERRED EMBODIMENTS

An embodiment regarding a motion assist device of the present invention will be described with reference to the drawings. Hereinafter, numerals "L" and "R" are used to differentiate a left side and a right side of legs or the like. If it is not necessary to differentiate the left side and the right side or a vector has both of the left and right components, the numerals can be omitted. In addition, symbols "+" and "−" are used to differentiate a flexion motion (forward motion) and a stretch motion (backward motion) of a leg (in particular, a thigh).

Figure 1:
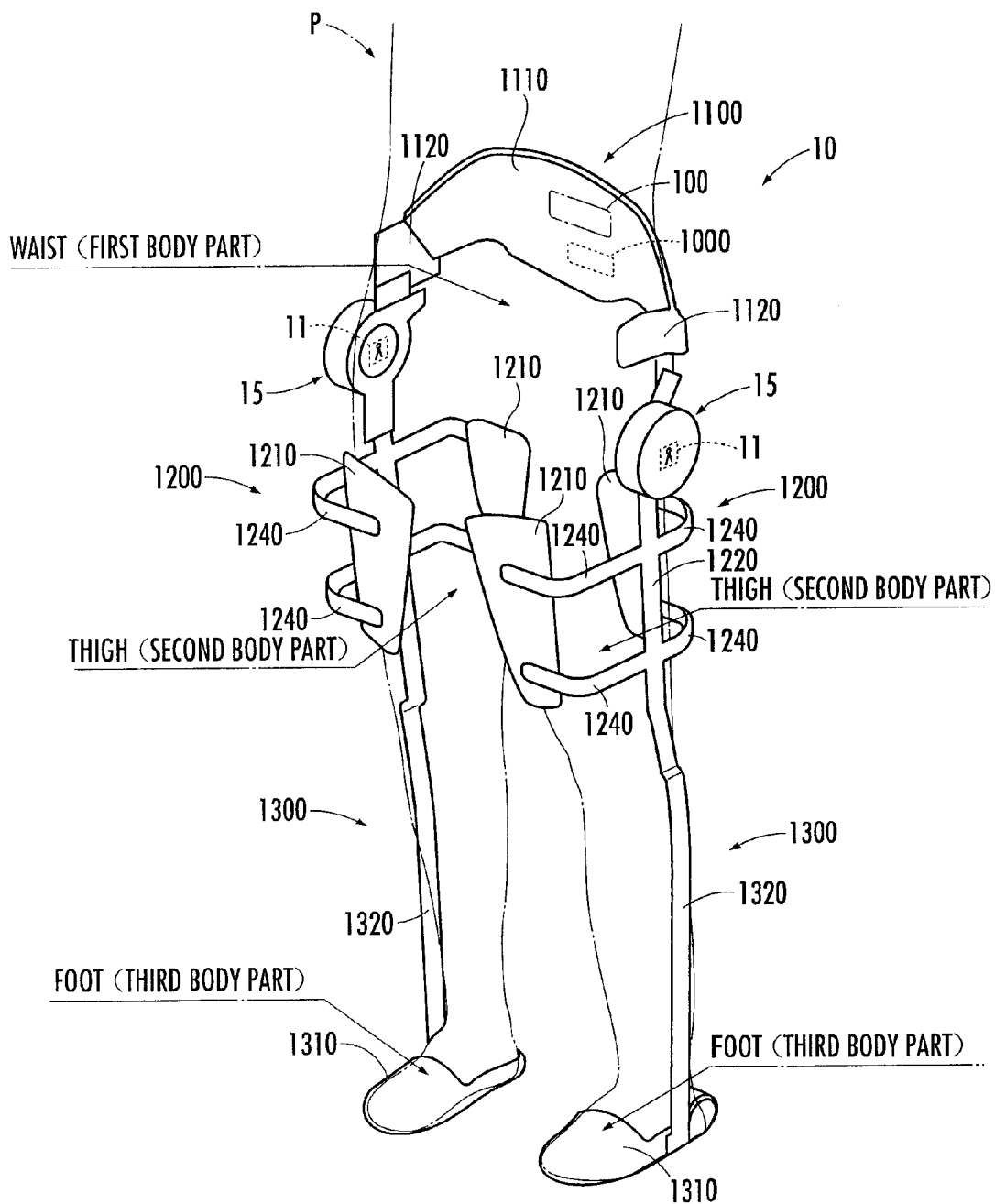
FIG. 1 is a structural view of a motion assist device according to an embodiment of the present invention.

The motion assist device 10 illustrated in FIG. 1 is a device configured to assist a walking motion of a human P according to a first embodiment of the present invention. The motion assist device 10 includes a first orthosis 1100 attached to a waist (a first body part), a second orthosis 1200 attached to a thigh (a second body part) and a third orthosis 1300 attached to a foot (a third body part) of the human P. Further, the motion assist device 10 is provided with a hip joint angle sensor 11, an actuator 15, a controller 100 and a battery 1000.

The first orthosis 1100 is provided with a first supporter 1110 and a first link member 1120. The first supporter 1110 is made from a combination of a rigid material such as a rigid resin and a flexible material such as a fiber. The first supporter 1110 is mounted on a back side of the waist. The first link member 1120 is made of a rigid resin, and is fixed at the first supporter 1110 in such a way that when the first supporter 1110 is attached to the waist, the first link member 1120 is located at both sides of the waist laterally. The second orthosis 1200 includes a second supporter 1210, a second link member 1220 and a rib member 1240. Similar to the first supporter 1110, the second supporter 1210 is also made from a combination of a rigid material and a flexible material and is mounted on a front side and a back side of the thigh, respectively. The second link member 1220 is made of a rigid resin, extending vertically along the thigh and is connected to an output shaft of the actuator 15. The rib member 1240 is made of a rigid resin in a way of extending laterally on the front side and back side, respectively, while bending along the thigh and is connected to the second supporter 1210. The third orthosis 1300 includes a third supporter 1310, a third link member 1320. The third supporter 1310 is formed to have a shape of a slipper or a shoe which is mounted to a foot of the human P. The third link member 1320 is made of rigid resin in a way of extending vertically along the lower leg. An upper end of the third link member 1320 is movably connected to a lower end of the first link member 1120, and a lower end thereof is movably connected to or fixed at the third supporter 1310. Note that the third orthosis 1300 may be omitted.

The hip joint angle sensor 11 includes a rotary encoder disposed on a transverse side of the waist of the human P and outputs a signal according to the hip joint angle. The actuator 15 is composed of a motor, including either one or both of a reduction gear and a compliance mechanism where appropriate. The battery 1000 is housed in the first orthosis 1100 (for example, fixed in multiple sheets of cloth constituting the first supporter 1110), which supplies electrical power to the actuator 15, the controller 100 and the like. Note that it is acceptable to attach or house the respective of the controller 100 and the battery 1000 in the second orthosis 1200 and the third orthosis 1300; it is also acceptable to dispose them separately from the motion assist device 10.

Figure 2:
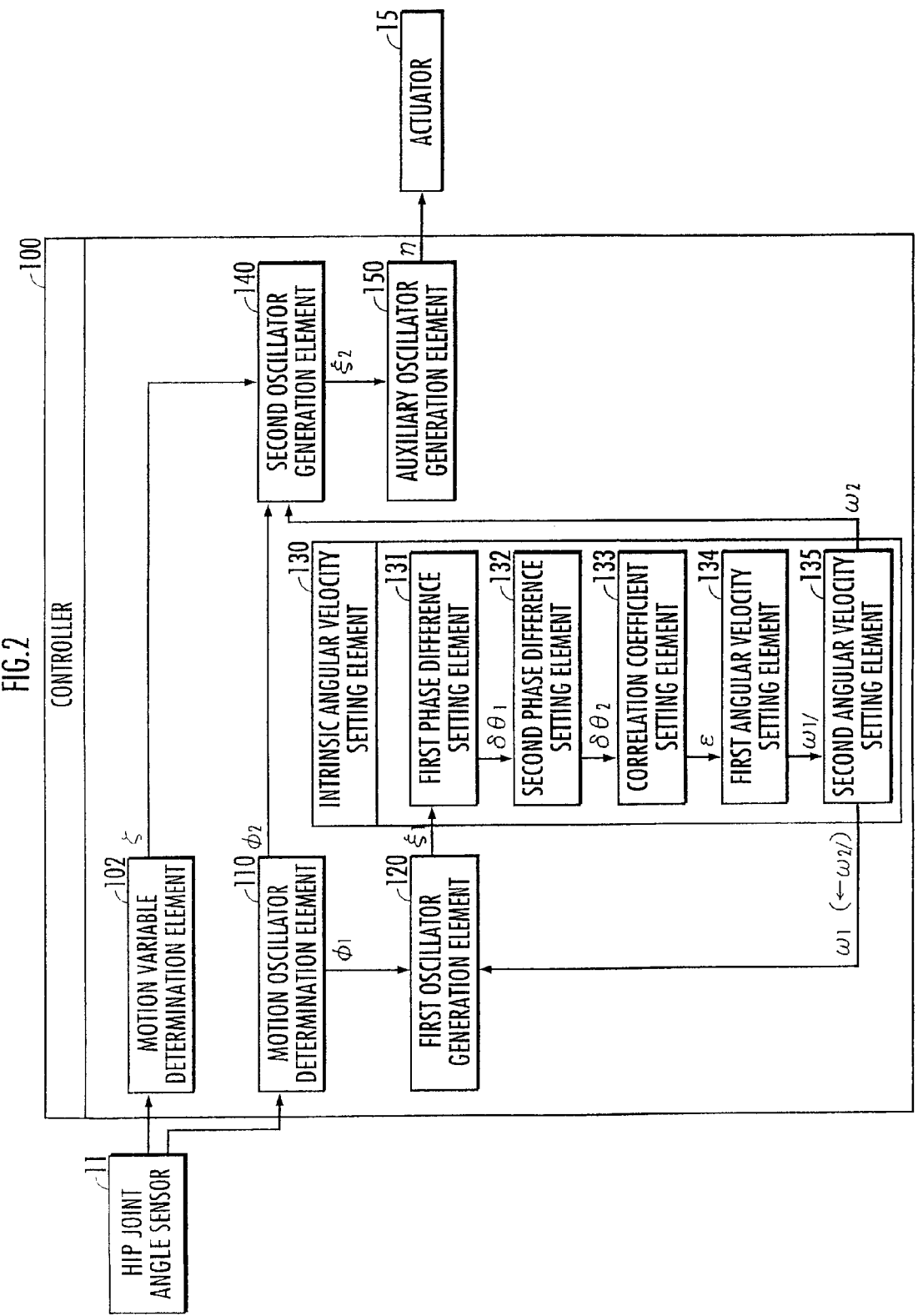
FIG. 2 is a structural block view of a controller of the motion assist device.

The controller 100 includes a computer housed in the first orthosis 1100 and software stored in a memory or a storing device in the computer. The controller 100 controls an operation or an output torque T of the actuator 15 by adjusting an electrical power supplied from the battery 1000 to the actuator 15. The controller 100 as illustrated in FIG. 2 is provided with a motion variable determination element 102, a motion oscillator determination element 110, a first oscillator generation element 120, an intrinsic angular velocity setting element 130, a second oscillator generation element 140, and an auxiliary oscillator generation element 150. Each element may be composed of a mutually independent CPU or the like, or a universal CPU or the like.

The motion variable determination element 102 determines a motion variable $\zeta$ which represents a motion scale of a periodical motion of the human P. The motion oscillator determination element 110 determines an angular velocity of each hip joint as a first motion oscillator $\phi_1$ and an angle thereof as a second motion oscillator $\phi_2$ on the basis of an output from the hip joint angle sensor 11. The first motion oscillator $\phi_1$ and the second motion oscillator $\phi_2$ vary periodically according to the periodical motion of the human P, whose variation patterns are defined according to a magnitude and phase (or an angular velocity which is a first order differentiation of phase by time). Determination of an oscillator refers to the determination of a periodical variation pattern of the oscillator. The first oscillator generation element 120 generates a first oscillator $\xi_1$ as an output oscillation signal by inputting the first motion oscillator $\phi_1$ determined by the motion oscillator determination element 110 to a first model as an input oscillator signal. The generation of an oscillator refers to the definition of the periodical variation pattern of the oscillator. The "first model" is a model which generates the output oscillation signal varying at a specific angular velocity defined according to a first intrinsic angular velocity $\omega_1$ by entraining to the input oscillation signal (synchronization phenomenon).

The intrinsic angular velocity setting element 130 includes a first phase difference setting element 131, a second phase difference setting element 132, a correlation coefficient setting element 133, a first angular velocity setting element 134, and a second angular velocity setting element 135. The intrinsic angular velocity setting element 130 sets a second intrinsic angular velocity $\omega_2$ on the basis of a first phase difference $\delta\theta_1$ and a virtual model so as to approximate a second phase difference $\delta\theta_2$ to a desired phase difference $\delta\theta_0$. The first phase difference $\delta\theta_1$ is the phase difference between the first motion oscillator $\phi_1$ determined by the motion oscillator determination element 110 and the first oscillator $\xi_1$ generated by the first oscillator generation element 120. The virtual model is a model which represents the periodical motion of the human P as a periodical variation of a first virtual oscillator $\phi_1$, the periodical operation of the motion assist device 10 as a periodical variation of a second virtual oscillator $\phi_2$, and the phase difference between the periodical motion of the human P and the periodical operation of the motion assist device 10 as a phase difference between the first virtual oscillator $\phi_1$ and the second virtual oscillator $\phi_2$, respectively.

The second oscillator generation element 140 generates a second oscillator $\xi_2$ as an output oscillation signal from a second model by inputting the second motion oscillator $\phi_2$ determined by the motion oscillator determination element 110 to the second model as an input oscillator signal. The "second model" is a model which generates the output oscillation signal varying at a specific angular velocity defined according to the second intrinsic angular velocity $\omega_2$ defined by the intrinsic angular velocity setting element 130 on the basis of the input oscillation signal.

The auxiliary oscillator generation element 150, on the basis of the second oscillator $\xi_2$ generated by the second oscillator generation element 140, generates an auxiliary oscillator $\eta$ for defining a variation pattern of a torque applied to the thigh by the actuator 15 of the motion assist device 10.

Hereinafter, the assisting method for the walking motion of the human P according to the motion assist device 10 with the aforementioned configurations will be explained.

The motion variable determination element 102, on the basis of the output signal from the hip joint angle sensor 11, determines the left hip joint angle and the right hip joint angle at respective finished time of the flexion motion and the finished time of the stretch motion of the thigh in each walking cycle (FIG. 3/S002), in detail the left hip joint angle at the finished time of the flexion motion, the left hip joint angle at the finished time of the stretch motion, the right hip joint angle at the finished time of the flexion motion and the right hip joint angle at the finished time of the stretch motion of the thigh, as the motion variable $\zeta=\{\zeta_i|i=L+, L-, R+, R-\}$. Note that it is acceptable to determine a footstep of the human P as the motion variable $\zeta$. The footstep, for example, may be determined on the basis of a correlation among the hip joint angle of the human P which is determined according to the output signal from the hip joint angle sensor 11, the hip joint angle of the human P stored in memory, and the foot positions in the anteroposterior direction. Herein, it is acceptable to determine a step rate (numbers of steps per unit time) and a walking speed of the human P, and thereafter determine the footstep of the human P on the basis of the step rate and the walking speed. The step rate may be determined on the basis of an output signal from an acceleration sensor attached to the human P, which outputs the output signal according to an acceleration of the human P in the vertical direction. The walking speed may be determined on the basis of an output signal from a speed sensor in a treadmill 30 for outputting the output signal according to the speed of an endless belt 32. Moreover, it is also acceptable to determine the value of a function, namely the motion variable $\zeta$, having multiple variables containing at least one of the walking rate (=footstep/ step rate), the footstep, the left hip joint angle at the finished time of the flexion motion and the left hip joint angle at the finished time of the stretch motion, the right hip joint angle at the finished time of the flexion motion and the right hip joint angle at the finished time of the stretch motion of the thigh in each walking cycle.

Figure 3:
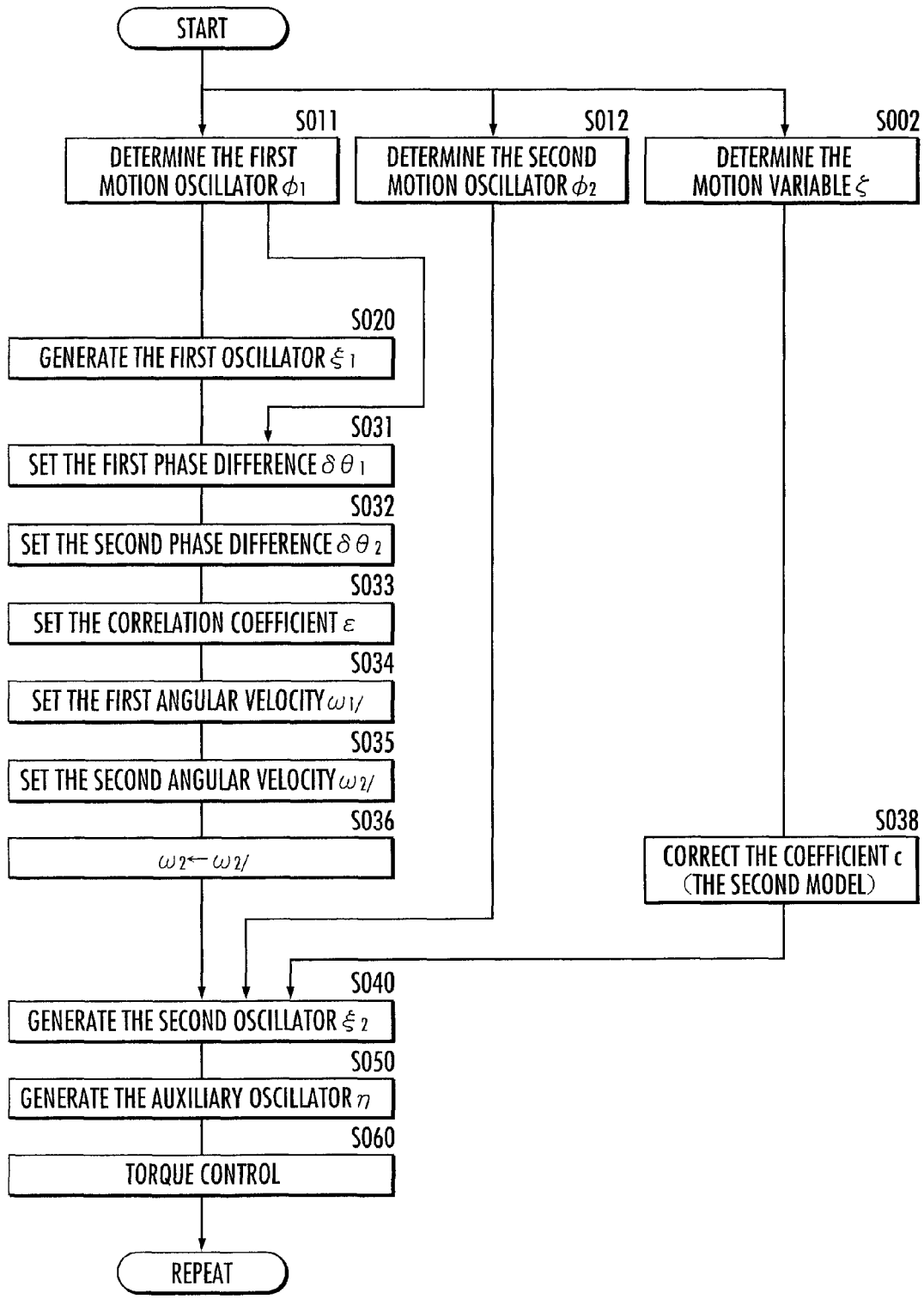
FIG. 3 is a flow chart illustrating a controlling method of the motion assist device.

Further, the motion oscillator determination element 110 determines the angular velocity of each of the left and right hip joints of the human P as the first motion oscillator $\phi_1=(\phi_{1L}, \phi_{1R})$ on the basis of the output from the hip joint angle sensor 11 (FIG. 3/S011). Furthermore, the motion oscillator determination element 110 determines the left hip joint angle and the right joint angle of the human P as the second motion oscillator $\phi_2=(\phi_{2L}, \phi_{2R})$ on the basis of the output from the hip joint angle sensor 11 (FIG. 3/S012).

Note that it is acceptable to determine an arbitrary variable varying periodically according to the periodical motion of the human P by using an appropriate sensor as the first motion oscillator $\phi_1$ and the second motion oscillator $\phi_2$, respectively. For example, the angle or angular velocity of an arbitrary joint, such as the hip joint, knee joint, foot joint, shoulder joint, elbow joint and the like, and the position of the thigh, foot, upper arm, hand and waist (the position or the like in the anteroposterior direction or the vertical direction with reference to the center-of-gravity of the human P), and the variation patterns of velocity and acceleration may be determined as the motion oscillator. The variation patterns of various parameters varying at a rhythm in conjunction with the walking motion rhythm, such as sounds generated when the left or right foot steps on ground, breathing sounds, deliberate phonations or the like, may be determined as one or both of the first motion oscillator $\phi_1$ and the second motion oscillator $\phi_2$. Moreover, it is acceptable to determine variables representing the periodical motion state of an identical body part, such as the angle and the angular velocity or the like of an identical joint, as each of the first motion oscillator $\phi_1$ and the second motion oscillator $\phi_2$; it is also acceptable to determine variables representing the periodical motion state of different body parts, such as the respective the angular velocities or the like of different joints, as each of the first motion-oscillator $\phi_1$ and the second motion oscillator $\phi_2$.

Thereafter, the first oscillator generation element 120 generates the first oscillator $\xi_1$ as the output oscillation signal by inputting the first motion oscillator $\phi_1$ determined by the motion oscillator determination element 110 to the first model as the input oscillation signal (FIG. 3/S011). As described above, the first model denotes the correlation between a plurality of the first elements such as the left and right feet or the like, and generates the output oscillation signal which varies at the angular velocity defined according to the first intrinsic angular velocity $\omega_1=(\omega_{1L}, \omega_{1R})$ by entraining to the input oscillation signal. The first model, for example, may be defined by the Van der Pol equation expressed by the equation (10). Moreover, it is possible that the first oscillator generation element 120 sequentially updates the first model by adopting the latest second intrinsic angular velocity $\omega_2$ set by the intrinsic angular velocity setting element 130 as the latest first intrinsic angular velocity $\omega_1$, and generates a subsequent first oscillator as the output oscillation signal by inputting a subsequent first motion oscillator $\phi_1$ as the input oscillation signal into the updated first model.

$$(d^2\xi_{1L}/dt^2) = A(1-\xi_{1L}^2)(d\xi_{1L}/dt) - \omega_{1L}^2\xi_{1L} + g(\xi_{1L}-\xi_{1R}) + K_1(d\phi_{1L}/dt),$$

$$(d^2\xi_{1L}/dt^2) = A(1-\xi_{1R}^2)(d\xi_{1R}/dt) - \omega_{1R}^2\xi_{1R} + g(\xi_{1R}-\xi_{1L}) + K_1(d\phi_{1L}/dt) \quad (10)$$

Wherein:

A: a positive coefficient set in such a way that a stable limit cycle may be drawn from the first oscillator $\xi_1$ and the first order temporal differentiation value $(d\xi_1/dt)$ thereof in a plane of "$\xi_1-(d\xi_1/dt)$";

g: a first correlation coefficient for reflecting the correlation of different body parts such as the left and right feet of the human P or the like as a correlation (correlation between the output oscillation signals from the plurality of the first elements) of each of the left and right components of the first oscillator $\xi_1$; and $K_1$: a feedback coefficient related to the first motion oscillator $\phi_1$.

The first oscillator $\xi_1=(\xi_{1L}, \xi_{1R})$ is calculated or generated according to the Runge-Kutta method. The respective angular velocity of the components and $\xi_{1L}$ and $\xi_{1R}$ of the first oscillator $\xi_1$ represents a virtual rhythm which assists the motions of the left foot and the right foot, respectively. Further, the first oscillator $\xi_1$ has the property to vary or oscillate periodically with an autonomous angular velocity or rhythm defined on the basis of the first intrinsic angular velocity $\omega_1$ while harmonizing with the rhythm of the first motion oscillator $\phi_1$ varying at an angular velocity or rhythm substantially same as a rhythm of the actual walking motion, according to the "mutual entrainment" (harmonization effect) which is one of the properties of the Van del Pol equation.

In addition, the first model may be expressed by the Van der Pol equation having a form different from that of the equation (10), or by a certain equation which generates the output oscillation signal varying periodically at an angular velocity defined on the basis of the first intrinsic angular velocity $\omega_1$, accompanied by the mutual entrainment to the input oscillation signal. Moreover, it is acceptable to increase the numbers of the first motion oscillator $\phi_1$, namely the determination object. The more numbers of the first motion oscillator $\phi_1$ are input to the first model, the motion will be more elaborately assisted by considering the motions of various body parts of the human P through the adjustment of the correlation coefficients, although the correlation members in a non-linear differentiation equation corresponding to the generation of the first oscillator $\xi_1$ in the Van der Pol equation for defining the first model will become more accordingly.

The phase difference between the periodical motion of the human P and the periodical motion of the motion assist device 10 is used to define the moving behavior of the human P with respect to the motion of the motion assist device 10. For example, if the phase difference is positive, the human P moves in a way of leading the motion assist device 10. On the other hand, if the phase difference is negative, the human P can move in a way of being led by the motion assist device 10. Therefore, if the phase difference (the first phase difference) $\delta\theta_1$ of the first oscillator $\xi_1$ with respect to the first motion oscillator $\phi_1$ deviates from the desired phase difference $\delta\theta_0$, it is likely that the moving behavior of the human P will be made unstable. Consequently, there is a high probability that the motion rhythm of the human P whose relative motions between the waist and the thigh assisted by the torque T varying periodically at an angular velocity in relation to the auxiliary oscillator $\eta$ would deviate from the desired motion rhythm.

Therefore, from the viewpoint of matching the motion rhythm of the human P with the desired motion rhythm while maintaining the mutual harmonization between the first motion oscillator $\phi_1$ and the first oscillator $\xi_1$, an appropriate second intrinsic angular velocity $\omega_2$ for defining the angular velocity of the second oscillator $\xi_2$ is set by the intrinsic angular velocity setting element 130. In other words, an appropriate second intrinsic angular velocity $\omega_2$ is set from the viewpoint of maintaining an appropriate phase difference between an assist rhythm of the motion assist device 10 and the motion rhythm of the human P so that the motion rhythm of the human P is in accordance with the assist rhythm of the motion assist device 10 while harmonizing the assist rhythm of the motion assist device 10 with the motion rhythm of the human P.

Specifically, the first phase difference setting element 131 sets a phase difference between the first motion oscillator $\phi_1$ and the first oscillator $\xi_1$ as the first phase difference $\delta\theta_1$ (FIG. 3/S031). The first phase difference $\delta\theta_1$ is calculated or set on the basis of a difference of time between, for example, a time where $\phi_1=0$ and $(d\phi_1/dt)>0$ and a time where $\xi_1=0$ and $(d\xi_1/dt)>0$.

Thereafter, the second phase difference setting element 132 sets the second phase difference $\delta\theta_2$ on a condition that the first phase difference $\delta\theta_1$ over the recent three walking cycles is constant or the variation of the first phase difference $\delta\theta_1$ is within an allowable range (FIG. 3/S032). In detail, a phase difference between the first virtual oscillator $\phi_1=(\phi_{1L}, \phi_{1R})$ and the second virtual oscillator $(\phi_2=(\phi_{2L}, \phi_{2R})$ which are defined in the virtual model denoted by the equations (21) and (22) is set as the second phase difference $\delta\theta_2$ according to the equation (23). The first virtual oscillator $\phi_1$ in the virtual model virtually represents the first motion oscillator $\phi_1$, and the second virtual oscillator $\phi_2$ in the virtual model represents the auxiliary oscillator $\eta$ virtually.

$$d\phi_{1L}/dt = \omega_{1L} + \epsilon_L \sin(\phi_{2L}-\phi_{1L}), d\phi_{1R}/dt = \omega_{1R} + \epsilon_R \sin(\phi_{2R}-\phi_{1R}) \quad (21)$$

$$d\phi_{2L}/dt = \omega_{2L} + \epsilon_L \sin(\phi_{1L}-\phi_{2L}), d\phi_{2R}/dt = \omega_{2R} + \epsilon_R \sin(\phi_{1R}-\phi_{2R}) \quad (22)$$

$$\delta\theta_{2L} = \arcsin\{(\omega_{1L}-\omega_{2L})/2\epsilon_L\}, \delta\theta_{2R} = \arcsin\{(\omega_{1R}-\omega_{2R})/2\epsilon_R\} \quad (23)$$

Wherein, each component of "$\epsilon=(\epsilon_L, \epsilon_R)$" stands for a correlation coefficient representing the correlation between each component of the first virtual oscillator $\phi_1$ and each component of the second virtual oscillator $\phi_2$. "$\omega_1=(\omega_{1L}, \omega_{1R})$" is the angular velocity for each component of the first virtual oscillator $\phi_1$, and "$\omega_2=(\omega_{2L}, \omega_{2R})$" is the angular velocity for each component of the second virtual oscillator $\phi_2$.

Subsequently, the correlation coefficient setting element 133 sets the correlation coefficient $\epsilon$ so that the deviation between the first phase difference $\delta\theta_1$ set by the first phase difference setting element 131 and the second phase difference $\delta\theta_2$ set by the second phase difference setting element 132 will be minimum (FIG. 3/S033).

Specifically, the correlation coefficient $\epsilon(t_k)$ at each time $t_k$ where the first motion oscillator $\phi_1$ for each of the left and right components will be zero is sequentially set according to the equation (24).

$$\epsilon_L(t_{k+1}) = \epsilon_L(t_k) - B_L\{V_{1L}(t_{k+1}) - V_{1L}(t_k)\}/\{\epsilon_L(t_k) - \epsilon_L(t_{k-1})\},$$

$$\epsilon_R(t_{k+1}) = \epsilon_R(t_k) - B_R\{V_{1R}(t_{k+1}) - V_{1R}(t_k)\}/\{\epsilon_R(t_k) - \epsilon_R(t_{k-1})\},$$

$$V_{1L}(t_{k+1}) \equiv (1/2)\{\delta\theta_{1L}(t_{k+1}) - \delta\theta_{2L}(t_k)\}^2,$$

$$V_{1R}(t_{k+1}) \equiv (1/2)\{\delta\theta_{1R}(t_{k+1}) - \delta\theta_{2R}(t_k)\}^2 \quad (24)$$

Wherein, each component of "$B=(B_L, B_R)$" stands for a coefficient representing the stability of a potential $V_1=(V_{1L}, V_{1R})$ for approximating each component of the first phase difference $\delta\theta_1$ to each of the left and right components of the second phase difference $\delta\theta_2$, respectively.

Next, the first angular velocity setting element 134 sets the angular velocity of the first virtual oscillator $\phi_1$ as the first angular velocity $\omega_{1/}$ according to the correlation coefficient $\epsilon$ set by the correlation coefficient setting element 133 and the equation (25) so that the deviation between the first phase difference $\delta\theta1$ and the second phase difference $\delta\theta_2$ for each component will become minimum on a condition that the angular velocity $\omega_{2/}$ of the second virtual oscillator $\phi_2$ is constant (FIG. 3/S034).

$$\omega_{1/L}(t_k) = -\alpha_L \int dt q_{1L}(t), \omega_{1/R}(t_k) = -\alpha_R \int dt q_{1R}(t)$$

$$q_{1L}(t) = (4\epsilon_L^2(t_k) - (\omega_{1L}(t) - \omega_{2L}(t_k)))^{1/2} \times \sin(\arcsin[(\omega_{1/L}(t) - \omega_{2/L}(t_{k-1}))/2\epsilon_L(t_k)] - \delta\theta_{2L}(t_k)),$$

$$q_{1R}(t) = (4\epsilon_R^2(t_k) - (\omega_{1R}(t) - \omega_{2R}(t_k)))^{1/2} \times \sin(\arcsin[(\omega_{1/R}(t) - \omega_{2/R}(t_{k-1}))/2\epsilon_R(t_k)] - \delta\theta_{2R}(t_k)) \quad (25)$$

Wherein, each component of "$\alpha=(\alpha_L, \alpha_R)$" stands for the coefficient representing the stability of the system.

The virtual model is constructed on a condition that the mutual harmonization between the first motion oscillator $\phi_1$ and the first oscillator $\xi_1$ is also maintained between the first virtual oscillator $\phi_1$ and the second virtual oscillator $\phi_2$ through setting the correlation coefficient $\epsilon$ and the angular velocity $\omega_{1/}$. In other words, the virtual model is constructed so that the first virtual oscillator $\phi_1$ representing the periodical motion of the human P and second virtual oscillator $\phi_2$ representing the periodical motion of the motion assist device 10 vary periodically with the second phase difference $\delta\theta_2$ while harmonizing with each other.

Thereafter, the second angular velocity setting element 135 sets the angular velocity of the second virtual oscillator $\phi_2$ as the second angular velocity $\omega_{2/}$ for each component on the basis of the first angular velocity $\omega_{1/}$ set by the first angular velocity setting element 134 (FIG. 3/S035). The second angular velocity $\omega_{2/}=(\omega_{2/L}, \omega_{2/R})$ is set according to the equation (26) so that the second phase difference $\delta\theta_2$ for each of the left and right components approximates to the desired phase difference $\delta\theta_0$. Subsequently, the second angular velocity $\omega_{2/}$ is set as the second intrinsic angular velocity $\omega_2$ (FIG. 3/S036).

$$\omega_{2/L}(t_k) = \beta_L \int dt q_{2L}(t), \omega_{2/R}(t_k) = \beta_R \int dt q_{2R}(t)$$

$$q_{2L}(t) = (4\epsilon_L^2(t_k) - (\omega_{1/L}(t) - \omega_{2/L}(t_k)))^{1/2} \times \sin(\arcsin[(\omega_{1/L}(t_k) - \omega_{2/L}(t))/2\epsilon_L(t_k)] - \delta\theta_0),$$

$$q_{2R}(t) = (4\epsilon_R^2(t_k) - (\omega_{1/R}(t) - \omega_{2/R}(t_k)))^{1/2} \times \sin(\arcsin[(\omega_{1/R}(t_k) - \omega_{2/R}(t))/2\epsilon_R(t_k)] - \delta\theta_0) \quad (26)$$

Wherein, each component of "$\beta=(\beta_L, \beta_R)$" stands for the coefficient representing the stability of the system.

Accordingly, the second angular velocity $\omega_{2/}$ is appropriately set from the viewpoint of approximating the phase difference between the periodical motion of the human P represented by the first virtual oscillator $\phi_1$ and the periodical motion of the motion assist device 10 represented by the second virtual oscillator $\phi_2$ to the desired phase difference $\delta\theta_0$, while the mutual harmonization between the first motion oscillator $\phi_1$ and the first oscillator $\xi_1$ is maintained between the periodical motion of the human P and the periodical motion of the motion assist device 10.

The second oscillator generation element 140 corrects the second model by appropriately correcting a coefficient c contained in the simultaneous differentiation equation which represents the second model according to the equation (28) (FIG. 3/S038). "$c=\{c_i | i=L+, L-, R+, R-\}$" is a coefficient to be adjusted so that the motion variable $\zeta$ determined by the motion variable determination element 102 will approximate to a desired value $\zeta_0$ or a deviation therebetween will become minimum.

$$c_i(t_{k+1}) = c_i(t_k) - C_i\{V_i(t_{k+1}) - V_i(t_k)\}/\{c_i(t_k) - c_i(t_{k-1})\},$$

$$V_i(t_{k+1}) \equiv (1/2)\{\zeta_i(t_{k+1}) - \zeta_i(t_k)\}^2 \quad (28)$$

Each component of "$C=\{C_{L+}, C_{L-}, C_{R+}, C_{R-}\}$" stands for the coefficient representing the stability of a potential $V_2=(V_{2L+}, V_{2L-}, V_{2R+}, V_{2R-})$ for approximating each component of the determination values of the motion variable $\zeta$ to each component of the desired value $\zeta_0$ thereof. "$\zeta_0=\{\zeta_{0i} | i=L+, L-, R+, R-\}$" stands for the desired value for each of the left hip joint angle and the right hip joint angle at the finished time of the flexion motion and the stretch motion of the thigh every walking cycle, respectively. The desired value $\zeta_0$ may be calculated on the basis of the desired footstep of the human P which is stored preliminarily in the memory and the correlation stored preliminarily in the memory among the left hip joint angle and the right hip joint angle at the finished time of the flexion motion and the stretch motion of the thigh every walking cycle, respectively, and the footstep.

Thereafter, the second oscillator generation element 140 generates the second oscillator $\xi_2=(\xi_{2L+}, \xi_{2L-}, \xi_{2R+}, \xi_{2R-})$ as an output oscillation signal from the second model by inputting the second motion oscillator $\phi_2$ determined by the motion oscillator determination element 110 to the second model as an input oscillation signal (FIG. 3/S040). The second model is a model representing the correlation between a plurality of second elements including the neural elements or the like responsible for the motions to the flexion direction (forward direction) and the stretch direction (backward direction) of each leg. As aforementioned, the second model generates the output oscillation signal varying at an angular velocity defined according to the second intrinsic angular velocity $\omega_2$ set by the intrinsic angular velocity setting element 130 on the basis of the input oscillation signal.

The second model is defined by a simultaneous differentiation equation represented by, for example, the equation (30). The simultaneous differentiation equation contains therein a state variable $u=\{u_i | i=L+, L-, R+, R-\}$ representing the behavior state (specified by magnitude and phase) to each of the flexion direction (forward direction) and the stretch direction (backward direction) of each thigh, and a self-inhibition factor $v=\{v_i | i=L+, L-, R+, R-\}$ for representing compliance of each behavior state. Moreover, the simultaneous differentiation equation contains therein the desired value $\zeta_0$ for each of the left hip joint angle and the right hip joint angle at the finished time of the flexion motion and the stretch motion of the thigh every walking cycle, respectively, and the coefficient c to be corrected as mentioned above. Moreover, it is acceptable to increase the numbers of the second motion oscillator $\phi_2$, namely the determination object. The more numbers of the second motion oscillator $\phi_2$ are input to the second model, the more the correlation members in the simultaneous differentiation equation will become, however, it may allow an appropriate assist in the periodical motion of the human P by considering the correlation between motion states of various body parts of the human P through the adjustment of the correlation coefficients.

$$\tau_{1L+}(du_{L+}/dt) = c_{L+}\zeta_{0L+} - u_{L+} + w_{L+/L-}\xi_{2L-} + w_{L+/R+}\xi_{2R+} - \lambda_L v_{L+} + f_1(\omega_{2L}) + f_2(\omega_{2L})K_2\phi_{2L},$$

$$\tau_{1L-}(du_{L-}/dt) = c_{L-}\zeta_{0L-} - u_{L-} + w_{L-/L+}\xi_{2L+} + w_{L-/R-}\xi_{2R-} - \lambda_L v_{L-} + f_1(\omega_{2L}) + f_2(\omega_{2L})K_2\phi_{2L},$$

$$\tau_{1R+}(du_{R+}/dt) = c_{R+}\zeta_{0R+} - u_{R+} + w_{R+/L-}\xi_{2L-} + w_{R+/R-}\xi_{2R-} - \lambda_R v_{R+} + f_1(\omega_{2R}) + f_2(\omega_{2R})K_2\phi_{2R},$$

$$\tau_{1R-}(du_{R-}/dt) = c_{R-}\zeta_{0R-} - u_{R-} + w_{R-/L-}\xi_{2L-} + w_{R-/R+}\xi_{2R+} - \lambda_R v_{L+} + f_1(\omega_{2R}) + f_2(\omega_{2R})K_2\phi_{2R},$$

$$\tau_{2i}(dv_i/dt) = -v_i + \xi_{2i},$$

$$\xi_{2i} = H(u_i - u_{thi}) = 0 (u_i < u_{thi}) \text{ or } u_i(u_i \geq u_{thi}), \text{ or}$$

$$\xi_{2i} = fs(u_i) = u_i/(1 + \exp(-u_i/D)) \quad (30)$$

"$\tau_{1i}$" is a time constant for defining the variation feature of the state variable $u_i$. $\tau_{1i}$ is represented by the equation (31) using a $\omega$-dependant coefficient $t_{(\omega)}$ and a constant $\gamma = (\gamma_L, \gamma_R)$ and varies dependent on the second intrinsic angular velocity $\omega_2$.

$$\tau_{1i} = (t(\omega_{2L})/\omega_{2L}) - \gamma_L (i = L+, L-), (t(\omega_{2R})/\omega_{2R}) - \gamma_R (i = R+, R-) \quad (31)$$

"$\tau_{2i}$" is a time constant for defining the variation feature of the self-inhibition factor $v_i$. "$w_{i/j}$" is a negative second correlation coefficient representing the correlation between the state variables $u_i$ and $u_j$ which represent the motions of the left and right legs of the human P toward the flexion direction and the stretch direction as the correlation of each component of the second oscillator $\xi_2$ (correlation between the output oscillation signals of the plurality of the second elements). "$\lambda_L$" and "$\lambda_R$" are compliant coefficients. "$\kappa_2$" is a feedback coefficient related to the second motion oscillator $\phi_2$.

"$f_1$" is a linear function of the second intrinsic angular velocity $\omega_2$ defined according to the equation (32) using the positive coefficient c. "$f_2$" is a quadratic function of the second intrinsic angular velocity $\omega_2$ defined according to the equation (33) using the coefficients $c_0$, $c_1$ and $c_2$.

$$f_1(\omega) = c\omega \quad (32)$$

$$f_2(\omega) = c_0 + c_1\omega + c_2\omega^2 \quad (33)$$

The second oscillator $\xi_{2i}$ equals to zero when the value of the state variable $u_i$ is smaller than a threshold value $u_{thi}$; and equals to the value of $u_i$ when the value of the state variable $u_i$ is not smaller than the threshold value $u_{thi}$. In other words, the second oscillator $\xi_{2i}$ is defined by a sigmoid function fs (refer to equation (30)). According thereto, if the state variable $u_{L+}$ representing the behavior of the left thigh toward the forward direction increases, the magnitude of the left flexion component $\xi_{2L+}$ of the second oscillator $\xi_2$ becomes greater than that of the left stretch component $\xi_{2L-}$; if the state variable $u_{R+}$ representing the behavior of the right thigh toward the forward direction increases, the magnitude of the right flexion component $\xi_{2R+}$ of the second oscillator $\xi_2$ becomes greater than that of the right stretch component $\xi_{2R-}$. Further, if the state variable $u_{L-}$ representing the behavior of the left thigh toward the backward direction increases, the magnitude of the left stretch component $\xi_{2L-}$ of the second oscillator $\xi_2$ becomes greater than that of the left flexion component $\xi_{2L+}$; if the state variable $u_{R-}$ representing the behavior of the right thigh toward the backward direction increases, the magnitude of the right stretch component $\xi_{2R-}$ of the second oscillator $\xi_2$ becomes greater than that of the right flexion component $\xi_{2R+}$. The motion toward the forward or backward direction of the leg (thigh) is recognized by, for example, the polarity of the hip joint angular velocity.

Next, the auxiliary oscillator generation element 150 sets the auxiliary oscillator $\eta = (\eta_L, \eta_R)$ on the basis of the second oscillator $\xi_2$ generated by the second oscillator generation element 140 (FIG. 3/S050). Specifically, the auxiliary oscillator $\eta$ is generated according to the equation (40). In other words, the left component $\eta_L$ of the auxiliary oscillator $\eta$ is calculated as a sum of a product of the left flexion component $\xi_{2L+}$ of the second oscillator $\xi_2$ and the coefficient $\chi_{L+}$, and a product of the left stretch component $\xi_{2L-}$ of the second oscillator $\xi_2$ and the coefficient "$-\chi_{L-}$". The right component $\eta_R$ of the auxiliary oscillator $\eta$ is calculated as a sum of a product of the right flexion component $\xi_{2R+}$ of the second oscillator $\xi_2$ and the coefficient $\chi_{R+}$, and a product of the right stretch component $\xi_{2R-}$ of the second oscillator $\xi_2$ and the coefficient "$-\chi_{R-}$".

$$\eta_L = \chi_{L+}\xi_{2L+} - \chi_{L-}\xi_{2L-}, \eta_R = \chi_{R+}\xi_{2R+} - \chi_{R-}\xi_{2R-} \quad (40)$$

Thereafter, a current $I = (I_L, I_R)$ supplied to each of the left and right actuators 15 from the battery 1000 is adjusted by the controller 100 on the basis of the auxiliary oscillator $\eta$. The current I is represented by, for example, $I(t) = G_1 \cdot \eta(t)$ (wherein, $G_1$ is a ratio coefficient) on the basis of the auxiliary oscillator $\eta$. Thereby, the force for moving each thigh (the second body part) with respect to the waist (the first body part) or the torque $T = (T_L, T_R)$ around the hip joint, which is applied to the human P from the motion assist device 10 via the first orthosis 1100 and the second orthosis 1200, is adjusted (FIG. 3/S060). The torque T is represented by, for example, $T(t) = G_2 \cdot I(t)$ (wherein, $G_2$ is a ratio coefficient) on the basis of the current I. Thereafter, the series of the aforementioned processes are performed repeatedly. Note that it is acceptable to control the motion of the motion assist device 10 irrelative to the aforementioned control method on the condition that the thigh is appropriately moved with respect to the waist in a duration from the initiation of the walking motion of the human P to the end of 2-3 steps of the walking motion.

According to the motion assist device 10 in the first embodiment of the present invention which performs the aforementioned functions, the second orthosis 1200 is moved by the actuator 15 with respect to the first orthosis 1100 as illustrated in FIGS. 4(a) and 4(b), and the third orthosis 1300 is moved to follow the motion of the second orthosis 1200. Consequently, in addition to the periodical motions of the thigh (the second body part) being assisted with respect to the waist (the first body part), the lower leg (the third body part) is assisted so as to follow the thigh in motion. As a result, the periodical walking motion of the human P is assisted so that the scale and rhythm of the walking motion matches the desired motion scale and the desired motion rhythm thereof, respectively.

Specifically, the motion of the human P can be assisted by the motion assist device 10 so that the motion rhythm of the human P matches the desired motion rhythm due to the following reasons. In other words, as mentioned in the above, the second intrinsic angular velocity $\omega_2$ is set appropriately from the viewpoint of approximating the phase difference between the periodical motion of the human P represented by the first virtual oscillator $\phi_1$ and the periodical motion of the motion assist device 10 represented by the second virtual oscillator $\phi_2$ to the desired phase difference $\delta\theta_0$ while the mutual harmonization between the first motion oscillator $\phi_1$ and the first oscillator $\xi_1$ is maintained between the periodical motion of the human P and the periodical motion of the motion assist device 10 (FIG. 3/S031-S036). Since the second oscillator $\xi_2$ varies periodically at the angular velocity defined on the basis of the second intrinsic angular velocity $\omega_2$ and the output torque T is controlled on the basis of the second oscillator $\xi_2$, therefore, the output torque T varies periodically at the angular velocity defined on the basis of the second intrinsic angular velocity $\omega_2$ (FIG. 3/S040, S050 and S060). According thereto, by applying the torque T to the human P, the motion rhythm of the human P and the motion rhythm of the motion assist device 10 are harmonized, and the periodical walking motion of the human P is assisted so as to match the motion rhythm of the human P with the desired motion rhythm.

Moreover, the motion of the human P can be assisted by the motion assist device 10 so that the motion scale of the human P matches the desired motion scale due to the following reasons. In other words, the second model is corrected so as to approximate the value of the motion variable (the left hip joint angle and the right hip joint angle at the finished time of the flexion motion and the stretch motion of the thigh, respectively, in each walking cycle) $\zeta$ representing the motion scale of the periodical walking motion of the human P to the desired value $\zeta_0$ (FIG. 3/S038). Thereafter, the second oscillator $\xi_2$ is generated according to the corrected second model and the torque T applied to the human P is controlled on the basis of the second oscillator $\xi_2$ (FIG. 3/S050 and S060). Resultantly, in spite of the rhythm speed of the periodical motion of the human P, the periodical motion can be assisted by applying a force with an appropriate strength to the human P so as to make the motion scale (the footstep, the maximum hip joint angle or the like) thereof match the desired motion scale.

In the aforementioned embodiment, it is described that the motion of the human P is assisted. However, it is also possible to assist the walking motion of a creature other than a human, such as an ape, a dog, a horse, cattle or the like.

In the aforementioned embodiment, the motion assist device 10 is constituted to assist the walking motion of the human P (refer to FIG. 1). As another embodiment, it is acceptable to constitute the motion assist device 10 by varying the material, shape or the like of the first orthosis 1100, the second orthosis 1200 and the third orthosis 1300 so as to be attached to various body parts of the human P to assist various periodical motions except the walking motion. For example, it is acceptable to assist a periodical motion of the forearm with respect to the brachium. Moreover, it is acceptable to assist a periodical motion of the brachium with respect to the thigh of the human P.

Figure 5:
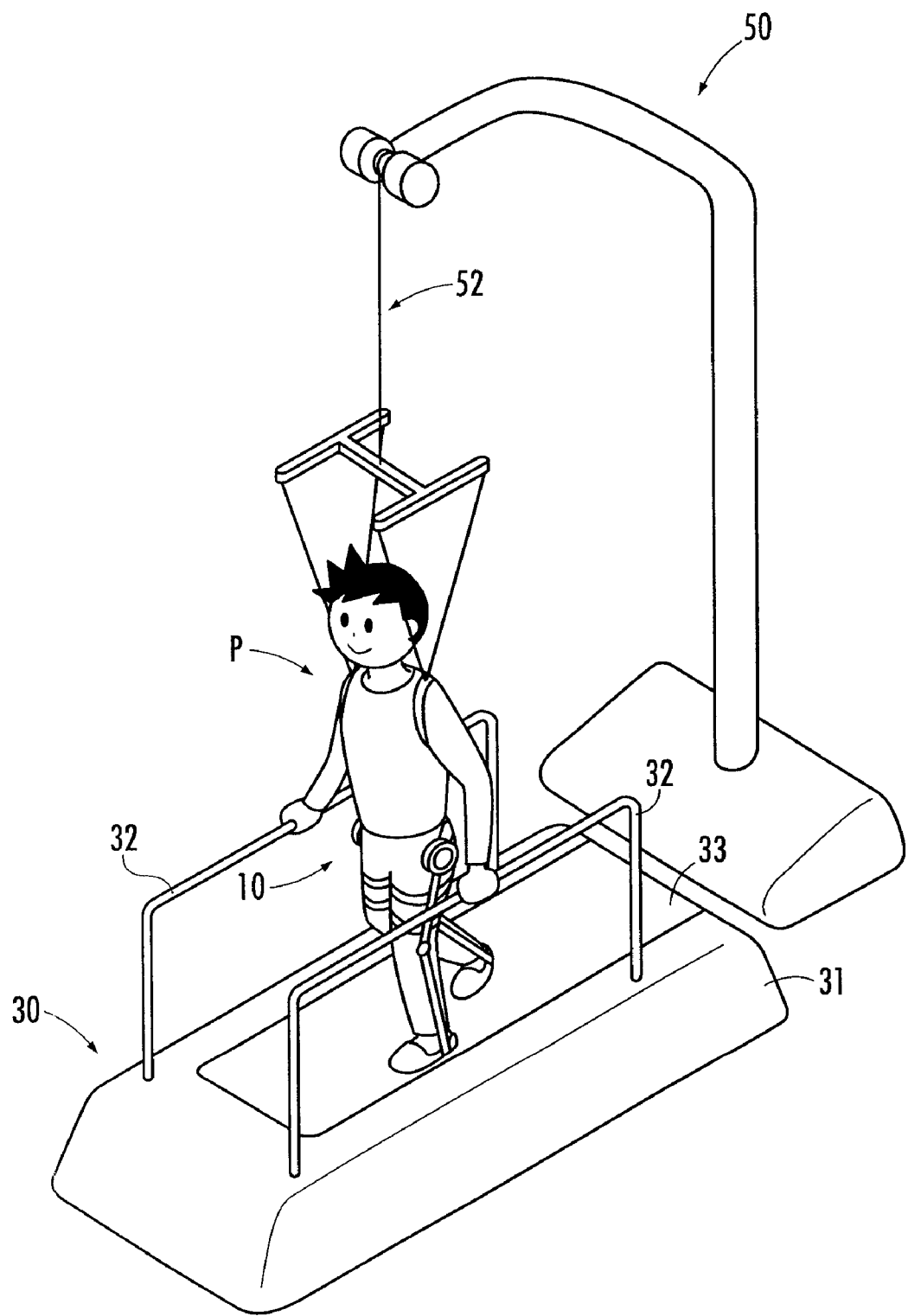
FIG. 5 is a view illustrating an example of walk training method by using the motion assist device.

The present invention is not limited to the motion assist device 10 to be used in the walk training of the human P as illustrated in FIG. 5, it is also possible to be used as a treadmill 30 and a lifter (a load alleviation tool) 50. The human P performs the walking motion so as to advance forward against the motion of an endless belt 33 moving backward with the partial weight thereof supported by holding with both hands on a handrail (load alleviation tool) 32 which is disposed at both sides of a base 31 of the treadmill 30. The endless belt 33 is wrapped over a plurality of rollers and the speed of the endless belt 33 is controlled by controlling the rotation velocity of a part of the plurality of rollers. Additionally, the partial weight of the human P is supported by a wire 52 whose winding amount is adjusted by the lifter 50.

Figure 6:
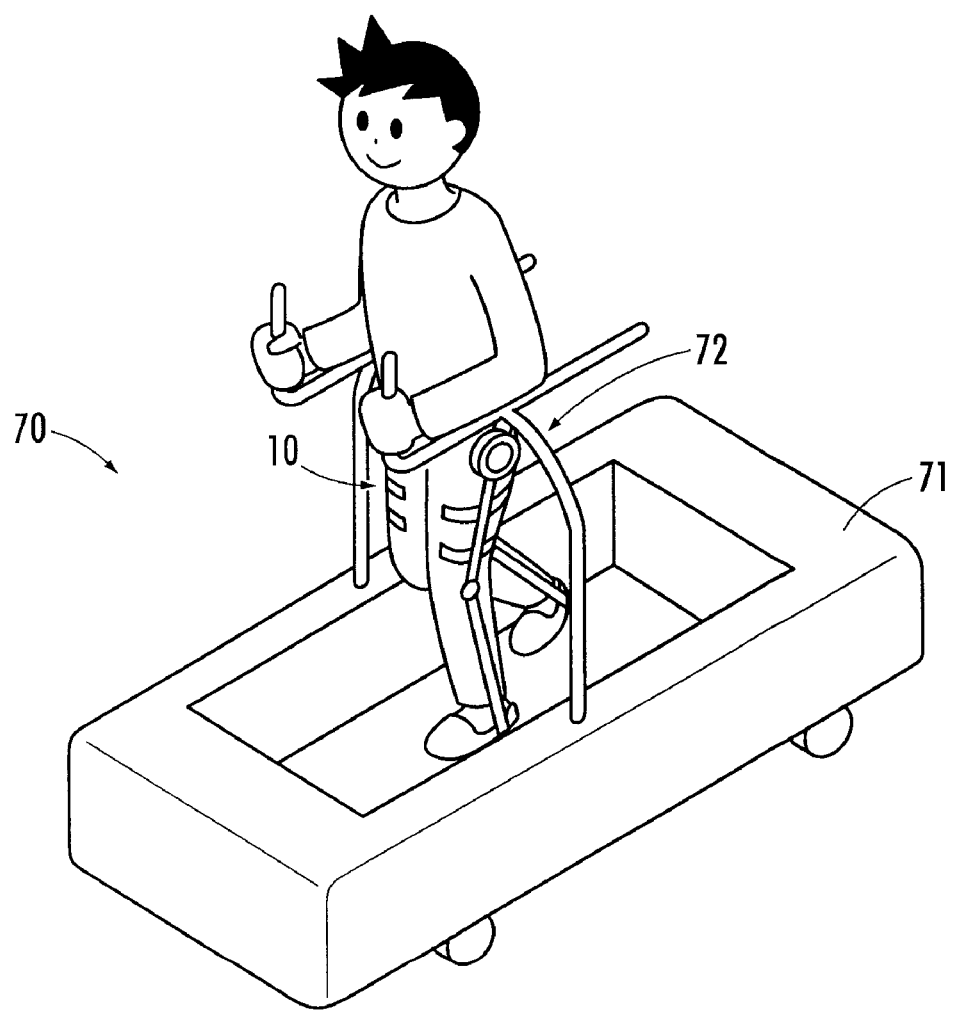
FIG. 6 is a view illustrating another example of walk training method by using the motion assist device.

Furthermore, a walking machine 70 as illustrated in FIG. 6 may be used in the walking training of the human P. The partial weight of the human P is supported by a handrail (load alleviation tool) 72 which is disposed at both sides of a base 71 of the walking machine 70 by holding with both hands thereon. The base 71 can move in accordance with the walking motion of the human P, while controlling the rotation velocity of wheels disposed at the bottom thereof.

What is claimed is:

1. A motion assist device comprising an orthosis mounted on a creature, an actuator connected to the orthosis and a controller configured to control a magnitude and a phase of an output from the actuator, and to assist a periodical motion of the creature by applying a periodically varying output from the actuator to the creature through the orthosis, wherein the controller includes a motion variable determination element configured to determine a value of a motion variable serving as a function of a magnitude of the periodical motion of the creature, respectively;

a motion oscillator determination element configured to determine a first and a second motion oscillators which vary periodically according to the periodical motion of the creature;

a first oscillator generation element configured to generate a first oscillator as an output oscillation signal from a first model by inputting the first motion oscillator determined by the motion oscillator determination element as an input oscillation signal to the first model, the first model generating the output oscillation signal varying at a specific angular velocity defined on a basis of a first intrinsic angular velocity by entraining to the input oscillation signal;

an intrinsic angular velocity setting element configured to set an angular velocity of a second virtual oscillator as a second intrinsic angular velocity on a basis of a first phase difference between the first motion oscillator determined by the motion oscillator determination element and the first oscillator generated by the first oscillator generation element and a virtual model denoting a first virtual oscillator and a second virtual oscillator which interact with each other and vary periodically with a second phase difference so as to approximate the second phase difference to a desired phase difference; and a second oscillator generation element configured to generate a second oscillator serving as a control basis for a force applied to the creature as an output oscillation signal from a second model by inputting the second motion oscillator determined by the motion oscillator determination element as an input oscillation signal to the second model, the second model generates the output oscillation signal varying at a specific angular velocity defined on a basis of the second intrinsic angular velocity set by the intrinsic angular velocity setting element according to the input oscillation signal, the second oscillator generation element is configured to correct the second model so as to approximate the value of the motion variable determined by the motion variable determination element to a desired value.

2. The motion assist device according to claim 1, wherein the second model is defined by a simultaneous differential equation of a plurality of state variables denoting a behavior state of the creature;

the simultaneous differential equation contains a product of the desired value for the motion variable and a coefficient; and the second oscillator generation element generates the second oscillator on a basis of values of the state variables obtained by solving the simultaneous differential equation, and corrects the second model by correcting the coefficient so as to approximate the value of the motion variable determined by the motion variable determination element to the desired value.

3. The motion assist device according to claim 1, wherein
the orthosis includes a first orthosis mounted on a first body part, a second orthosis mounted on a second body part, and a third orthosis mounted on a third body part of the creature;

the actuator is connected directly to the first orthosis and the second orthosis, and is connected indirectly to the third orthosis through the second orthosis; and the motion assist device is adapted to apply the force to the creature through each of the first orthosis, the second orthosis and the third orthosis by controlling the actuator on the basis of the second oscillator generated by the second oscillator generation element.

* * * * *